United States Patent
Basso et al.

(10) Patent No.: US 7,492,771 B2
(45) Date of Patent: Feb. 17, 2009

(54) METHOD FOR PERFORMING A PACKET HEADER LOOKUP

(75) Inventors: Claude Basso, Raleigh, NC (US); Jean Louis Calvignac, Raleigh, NC (US); Chih-jen Chang, Apex, NC (US); Philippe Damon, Raleigh, NC (US); Ronald Edward Fuhs, Rochester, MN (US); Natarajan Vaidhyanathan, Carrboro, NC (US); Fabrice Jean Verplanken, La Gaude (FR); Colin Beaton Verrilli, Apex, NC (US); Scott Michael Willenborg, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 11/096,362

(22) Filed: Apr. 1, 2005

(65) Prior Publication Data
US 2006/0221966 A1  Oct. 5, 2006

(51) Int. Cl.
*H04L 12/56* (2006.01)
(52) U.S. Cl. .................................. 370/395.32
(58) Field of Classification Search ................ 370/351, 370/360, 389, 395.1, 395.3, 395.31, 395.32
See application file for complete search history.

(56) References Cited

U.S. PATENT DOCUMENTS

| | | | |
|---|---|---|---|
| 5,058,110 A | 10/1991 | Beach et al. | |
| 5,430,842 A | 7/1995 | Thompson et al. | |
| 5,752,078 A * | 5/1998 | Delp et al. | 710/7 |
| 6,400,730 B1 | 6/2002 | Latif et al. | |
| 6,427,169 B1 | 7/2002 | Elzur | |
| 6,650,640 B1 | 11/2003 | Muller et al. | |
| 6,658,002 B1 | 12/2003 | Ross et al. | |
| 6,678,746 B1 * | 1/2004 | Russell et al. | 710/1 |
| 6,724,769 B1 | 4/2004 | Sang | |
| 6,728,929 B1 | 4/2004 | Luong | |
| 6,735,670 B1 | 5/2004 | Bronstein et al. | |
| 6,751,229 B1 | 6/2004 | Waller et al. | |
| 6,754,662 B1 | 6/2004 | Li | |
| 6,788,697 B1 | 9/2004 | Aweya et al. | |

(Continued)

FOREIGN PATENT DOCUMENTS

WO  03049488 A1  6/2003

OTHER PUBLICATIONS

Mazzucco, "The Fundamentals of Cache", Oct, 17, 2000, SystemLogic.Net, all pages.*

(Continued)

*Primary Examiner*—Kwang B. Yao
*Assistant Examiner*—Adam Duda
(74) *Attorney, Agent, or Firm*—Sawyer Law Group LLP

(57) ABSTRACT

A method for performing a lookup for a packet in a computer network are disclosed. The packet includes a header. The method includes providing a parser, providing a lookup engine coupled with the parser, and providing a processor coupled with the lookup engine. The parser is for parsing the packet for the header prior to receipt of the packet being completed. The lookup engine performs a lookup for the header and returns a resultant. In one aspect, the lookup includes performing a local lookup of a cache that includes resultants of previous lookups. The processor processes the resultant.

1 Claim, 11 Drawing Sheets

U.S. PATENT DOCUMENTS

| | | | |
|---|---|---|---|
| 6,822,968 | B1 | 11/2004 | Lim |
| 6,954,463 | B1 | 10/2005 | Ma et al. |
| 6,976,205 | B1 | 12/2005 | Ziai et al. |
| 7,023,811 | B2 | 4/2006 | Pinto |
| 7,031,304 | B1 | 4/2006 | Arberg et al. |
| 7,098,685 | B1 | 8/2006 | Agrawal et al. |
| 7,124,198 | B2 | 10/2006 | Pinkerton |
| 7,134,796 | B2 | 11/2006 | Anderson |
| 7,164,678 | B2 | 1/2007 | Connor |
| 7,218,632 | B1 * | 5/2007 | Bechtolsheim et al. ...... 370/389 |
| 7,260,120 | B2 | 8/2007 | Kang et al. |
| 7,269,661 | B2 | 9/2007 | Ree et al. |
| 7,271,706 | B2 | 9/2007 | Nguyen et al. |
| 7,274,706 | B1 | 9/2007 | Nguyen et al. |
| 7,283,528 | B1 | 10/2007 | Lim et al. |
| 7,292,586 | B2 | 11/2007 | Dewan et al. |
| 7,292,591 | B2 | 11/2007 | Parker et al. |
| 7,295,553 | B2 | 11/2007 | Saitoh |
| 7,308,006 | B1 | 12/2007 | Banerjee et al. |
| 2001/0027496 | A1 | 10/2001 | Boucher et al. |
| 2003/0022792 | A1 | 1/2003 | Benayoun et al. |
| 2003/0088689 | A1 | 5/2003 | Alexander et al. |
| 2003/0103499 | A1 | 6/2003 | Davis et al. |
| 2004/0022094 | A1 | 2/2004 | Radhakrishnan et al. |
| 2004/0064590 | A1 | 4/2004 | Starr et al. |
| 2004/0081145 | A1 | 4/2004 | Harrekilde-Peterson et al. |
| 2004/0100952 | A1 | 5/2004 | Boucher et al. |
| 2004/0109465 | A1 | 6/2004 | Kim et al. |
| 2004/0218623 | A1 | 11/2004 | Goldenberg et al. |
| 2005/0076136 | A1 | 4/2005 | Cho et al. |
| 2005/0089031 | A1 | 4/2005 | Krueger |
| 2005/0114663 | A1 | 5/2005 | Cornell et al. |
| 2005/0120160 | A1 | 6/2005 | Plouffe et al. |
| 2005/0149677 | A1 | 7/2005 | Shimada et al. |
| 2005/0256975 | A1 | 11/2005 | Kaniz et al. |
| 2006/0120289 | A1 | 6/2006 | Cunningham |
| 2006/0187928 | A1 | 8/2006 | McGee et al. |
| 2006/0216958 | A1 | 9/2006 | Yee et al. |

OTHER PUBLICATIONS

Balena, Francesco, "Speed up searched with hash tables", Nov. 13, 2001, DevX.com, all pages.*

Acayan, Joseph, "Facsimile Transmital", Apr. 22, 2008, Sawyer Law Group, LLP, all pages.*

Kung, H.T., Gigabit Local Area Networks: A System Perspective, Apr. 1992, IEE Communications Magazine, vol. 30, Issue 4, pp. 79-89.

Cunningham, D.G., The Status of the 10-Gigabit Ethernet Standard, 2001, 27th European Conference on Optical Communication, 2001. ECOC '01, vol. 3, pp. 364-367.

IP Com, Reusing a 10 Gbps Ethernet Media Access Controller for a 1Gbps/100Mbps Ethernet, located at www.ip.com, IP.com No. IPCOM000133402D, Jan. 25, 2006, 6 pages.

Braden, Computing the Internet Checksum, RFC 1071, Sep. 1988.

Rijsinghani, Computing the Internet Checksum via Incremental Update, RFC 1624, May 1994.

Touch, Implementing the Internet Checksum in Hardware, RFC 1936, Apr. 1996.

* cited by examiner

METHOD FOR PERFORMING A PACKET HEADER LOOKUP

CROSS-REFERENCE TO RELATED APPLICATIONS

The present application is related to the following U.S. patent applications:

U.S. patent application, Ser. No. 11/097,608, entitled "Host Ethernet Adapter for Networking Offload in Server Environment", filed on even date herewith and assigned to the assignee of the present invention.

U.S. patent application, Ser. No. 11/096,363, entitled "Method and System for Accommodating Several Ethernet Ports and a Wrap Transmitted Flow Handled by a Simplified Frame-By-Frame Upper Structure", filed on even date herewith and assigned to the assignee of the present invention.

U.S. patent application, Ser. No. 11/096,571, entitled "Method and Apparatus for Providing a Network Connection Table", filed on even date herewith and assigned to the assignee of the present invention.

U.S. patent application, Ser. No. 11/097,051, entitled "Network Communications for Operating System Partitions", filed on even date herewith and assigned to the assignee of the present invention.

U.S. patent application, Ser. No. 11/097,652, entitled "Configurable Ports for a Host Ethernet Adapter", filed on even date herewith and assigned to the assignee of the present invention.

U.S. patent application, Ser. No. 11/096,365, entitled "System and Method for Parsing, Filtering, and Computing the Checksum in a Host Ethernet Adapter (HEA)", filed on even date herewith and assigned to the assignee of the present invention.

U.S. patent application, Ser. No. 11/096,353, entitled "System and Method for a Method for Reducing Latency in a Host Ethernet Adapter (HEA)", filed on even date herewith and assigned to the assignee of the present invention.

U.S. patent application, Ser. No. 11/097,055, entitled "Method and Apparatus for Blind Checksum and Correction for Network Transmissions", filed on even date herewith and assigned to the assignee of the present invention.

U.S. patent application, Ser. No. 11/097,430, entitled "System and Method for Computing a Blind Checksum in a Host Ethernet Adapter (HEA)", filed on even date herewith and assigned to the assignee of the present invention.

FIELD OF THE INVENTION

The present invention relates to computer networks, and more particularly to a method for improving the latency due to packet header lookups.

BACKGROUND OF THE INVENTION

FIG. 1 depicts a conventional system 10 for performing a packet header lookup. A lookup corresponding to the packet header is performed in order to determine how the packet is to be treated. For example, based upon the information contained in the packet header, typically in the form of an IP five-tuple, the packet may be routed or processed differently. The conventional system 10 includes a network processor 12, a main store 14, a network adapter 16, and an adapter memory 18.

The packet is received in the network adapter 16 and provided to the adapter memory 18. The packet may then be copied to a temporary buffer (not explicitly shown) in the main store 14. Once the packet has been received and copied into the main store 14, the processor 12 then parses the packet to obtain the header. Based upon the header, the processor 12 performs a lookup. Typically, a hash of portions of the five-tuple in the header is used as a key to perform the lookup. Once the processor 12 receives the resultant of the lookup, the processor 12 processes the data using the resultant and copies the packet data to the destination buffer (not shown) in the main store 14.

Although the conventional system functions, one of ordinary skill in the art will readily recognize that it is relatively slow. In particular, the packet is completely received and stored in the main store 14 before the processor 12 commences operations on the packet related to performing the header lookup. Once the header is obtained, the main store 14 is searched in order to obtain the appropriate data. Each of these operations consumes time.

Accordingly, what is needed is a more efficient method and system for performing a packet header lookup. The present invention addresses such a need.

BRIEF SUMMARY OF THE INVENTION

The present invention provides a method for performing a lookup for a packet in a computer network. The packet includes a header. The method includes providing a parser, providing a lookup engine coupled with the parser, and providing a processor coupled with the lookup engine. The parser is for parsing the packet for the header prior to receipt of the packet being completed. The lookup engine performs a lookup for the header and returns a resultant. In one aspect, the lookup includes performing a local lookup of a cache that includes resultants of previous lookups. The processor processes the resultant.

According to the method disclosed herein, the present invention may improve the efficiency of the header lookup, resulting in a lower latency.

DETAILED DESCRIPTION OF THE INVENTION

The present invention relates to computer networks. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for performing a lookup for a packet in a computer network. The packet includes a header. The method and system include providing a parser, providing a lookup engine coupled with the parser, and providing a processor coupled with the lookup engine. The parser is for parsing the packet for the header prior to receipt of the packet being completed. The lookup engine performs a lookup for the header and returns a resultant. In one aspect, the lookup includes performing a local lookup of a cache that includes resultants of previous lookups. The processor processes the resultant.

The present invention will be described in terms of a particular computer system. However, one of ordinary skill in the art will readily recognize that the method and system in accordance with the present invention can be incorporated into another computer system having different and/or other components.

Figure 1:
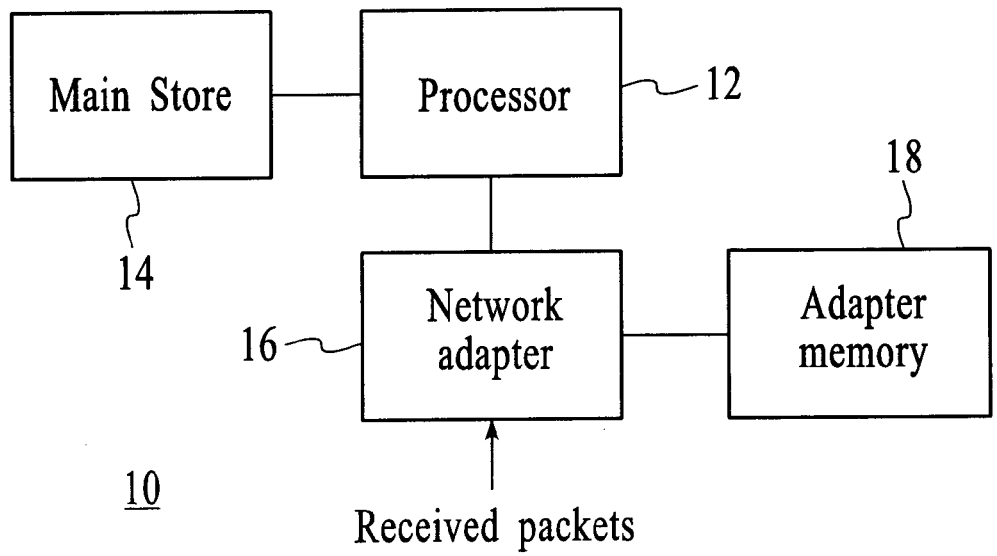
FIG. 1 is a diagram of a conventional system for performing a packet header lookup.
Figure 2:
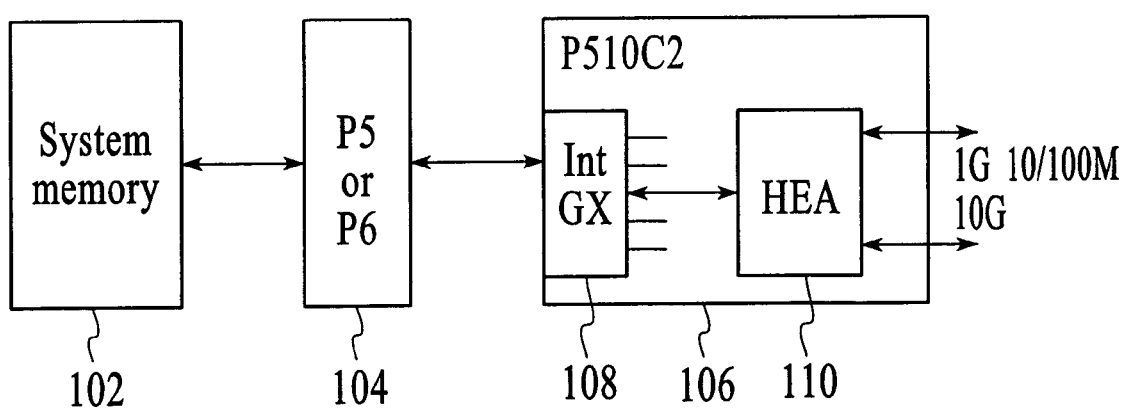
FIG. 2 is a block diagram of a server system in accordance with the present invention.

FIG. 2 is a block diagram of a server system 100 in accordance with the present invention. The server system 100 includes a processor 104 which is coupled between a system memory 102 and an interface adapter chip 106. The interface adapter chip 106 includes an interface 108 to the private (Gx) bus of the processor 104 and a Host Ethernet Adapter (HEA) 110. The HEA 110 receives and transmits signals from and to the processor 104.

The HEA 110 is an integrated Ethernet adapter. A set of accelerator features are provided such that a TCP/IP stack within the servers uses those features when and as required. The interface between the processor 104 and the interface adapter chip 106 has been streamlined by bypassing the PCI bus and providing interface techniques that enable demultiplexing and multiqueueing and packet header separation. In so doing an Ethernet adapter is provided that allows for improved functionality with high speed system while allowing for compatibility with legacy server environments. Some of the key features of this improved functionality are described hereinbelow.

Acceleration Functions

The HEA 110 supports advanced acceleration features. One key observation is that the current acceleration functions do a good job on the transmit side (e.g. transmitting packets from the processor) but not a very good job on the receive side (e.g. receiving packets via the adapter). The HEA 110 addresses this gap by introducing new features such as Packet Demultiplexing and Multiqueueing, and Header separation.

All of the HEA 110 new features are optional; it is up to the TCP/IP stack to take advantage of them if and when required. For example, a vanilla TCP/IP stack can use the HEA 110 without using per the connection queueing feature and yet take advantage of the other features of HEA such as throughput, low latency and virtualization support.

Packets Demultiplexing and Multiqueueing

Multiqueueing and Demultiplexing is the key feature to support functions such as virtualization, per connection queueing, and OS bypass. HEA demultiplexing uses the concept of Queue Pairs, Completion Queues and Event Queues. Enhancements have been added to better address OS protocol stacks requirements and short packet latency reduction.

Depending upon system requirements and configuration, HEA can demultiplex incoming packets based on:

Destination MAC address (typically one MAC address and one default queue per partition)

Connection identifier for established connections (Protocol, Source IP address, Destination IP address, Source port, Destination port).

Destination port and optionally destination IP address for TCP connection setup packet (SYN).

Packet Header Separation

HEA is optionally capable of separating the TCP/IP header from the data payload. This feature allows the header to be directed to the protocol stack for processing without polluting the received buffers posted by the applications. This feature is a component required for enabling zero-copy operations.

Enhanced Features

Many enhanced features are provided by the HEA 110 in the server environment. Some of these features are listed below.

(a) Multiple Receive Queue: The queue pair concept is extended to support more than one receive queue per pair. This enables the stack to better manage its buffer pool memory. For example, one queue can be assigned to small packets, one to medium packets and one to large packets. The HEA will select the ad hoc queue according to the received packet size.

(b) Low Latency Queue: On the transmit side a descriptor (WQE) may contain immediate data, in such case no indirection, i.e., no additional DMA from system memory is required to get the data to be sent. On the receive side, low latency queues do not supply buffers but rather receive immediate packet data. The HEA writes to the receive queue rather than reading. Short packets take advantage of this feature leading to a dramatic reduction of DMA operations: one single DMA write per packet as opposed to one DMA read and one DMA write per packet.

(c) Receive low latency queues are also used to support the packet header separation: the header is written in the low latency queue while the payload is DMAed to a buffer indicated in the ad-hoc receive queues.

In summary, Demultiplexing and Multiqueueing, Address Translation and Packet Header Separation are the basic building blocks to virtualization and provide low latency in operation. Furthermore, it should be noted that these features can also be used to improve traditional OS protocol stack performance, for example, per-connection queueing allows for the removal of code and more importantly the memory accesses—associated stalls/cache pollution—consumed to locate the TCP connection control block (TCB) in the system memory.

To describe the features of the HEA 110 in more detail refer now to the following description in conjunction with the accompanying figures.

Figure 3:
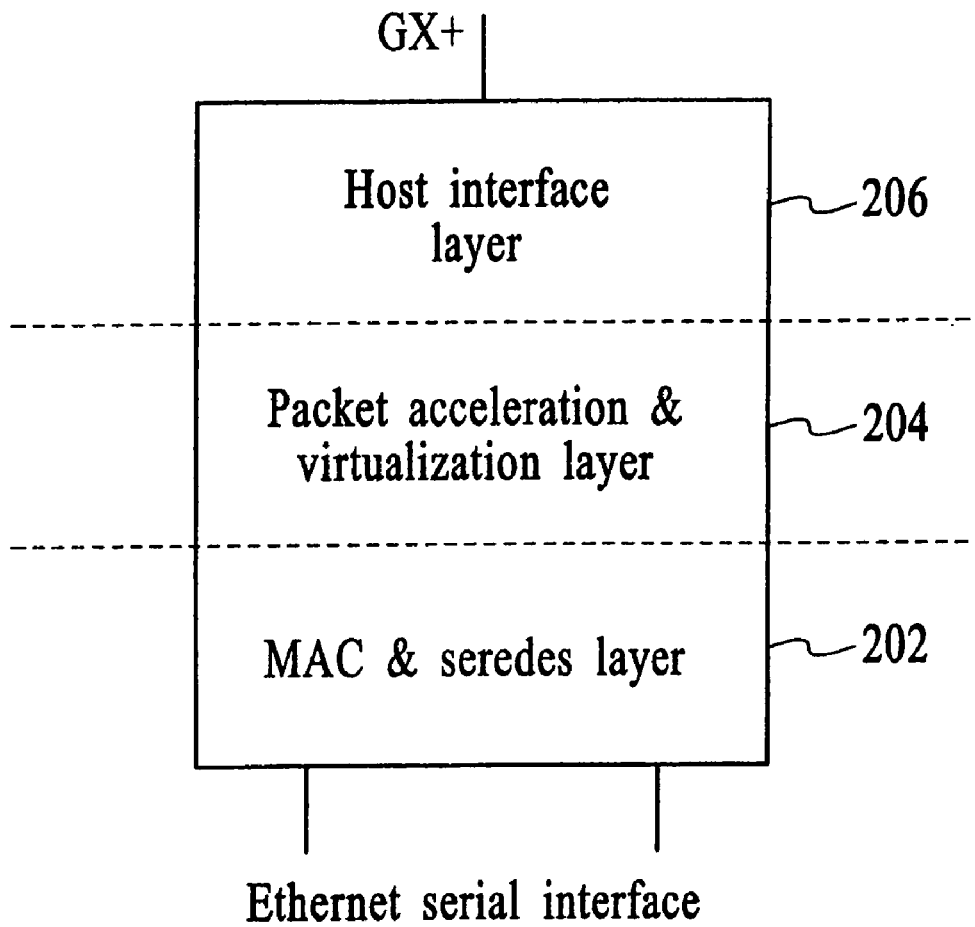
FIG. 3 is a simple block diagram of one embodiment of the host Ethernet adapter in accordance with the present invention.

FIG. 3 is a simple block diagram of the HEA 110 in accordance with the present invention. As is seen the HEA 110 has a three layer architecture. The first layer comprises a Media Access Controller (MAC) and Serialization/Deserialization (Serdes) Layer 202 which provides a plurality of interfaces from and to other devices on the Ethernet network. In the layer 202 the same chip I/Os are used to provide a plurality of interfaces. For example, in a preferred embodiment, the same chip I/Os are utilized to provide either a 10 Gigabit interface or a 1 Gigabit interface.

The second layer comprises a Packet Acceleration and Virtualization Layer 204. The layer 204 provides for receiving packets and demultiplexing the flow of packets for enabling virtualization. The layer 204 enables virtualization or partitioning of the operating system of a server based upon the packets. The layer 204 also provides packet header separation to enable zero copy operation. Also since layer 204 interacts directly with the private bus (Gx) through the Host Interface Layer 206, a low latency, high bandwidth connection is provided.

The third layer comprises the Host Interface Layer 206. The Host Interface Layer 206 provides the interface to the Gx or private bus of the processor. The layer 206 provides for multiple receive sub-queues per Queue Pair (QP) to enable effective buffer management for a TCP stack. The host layer 206 provides the context management for a given flow of data packets.

To describe the features of each of the layers 202, 204 and 206 of the HEA 100 in more detail refer now to the following discussions in conjunction with the accompanying figures.

MAC and Serdes Layer 202

Figure 4:
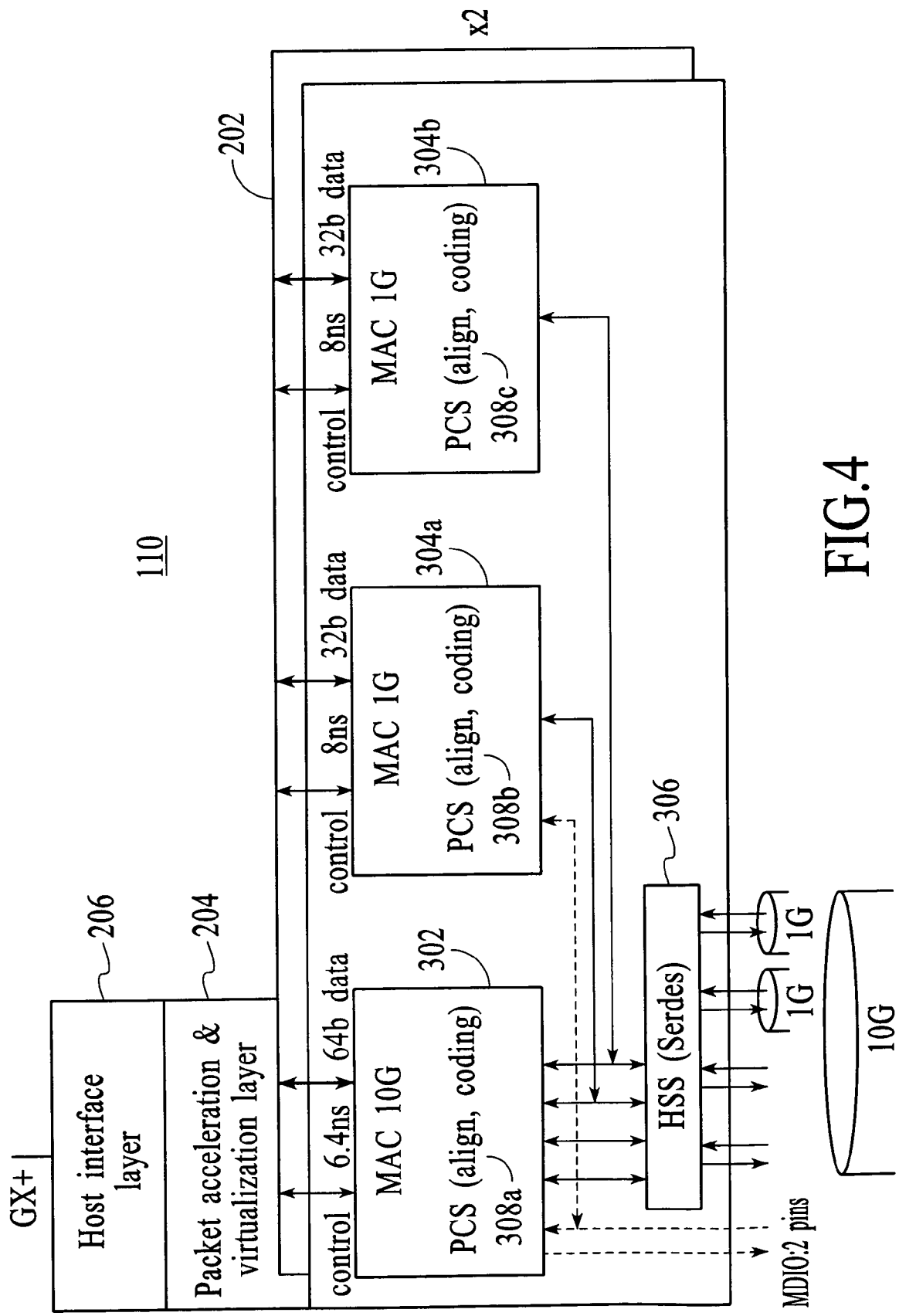
FIG. 4 is a block diagram of one embodiment of the host Ethernet adapter in accordance with the present invention with a more detailed view of the MAC and Serdes Layer.

FIG. 4 is a block diagram of the HEA 110 with a more detailed view of the MAC and Serdes Layer 202. As is seen in this embodiment there is one 10 Gigabit MAC 302 and four 1 Gigabit MACs 304a and 304b. The MACs 302, 304 and 304b include analog coding units 308a, 308b and 308c for aligning and coding the packets received. The MACs 302, 304a and 304b are coupled to a High Speed Serializer/deserialization (HSS) 306. The HSS 306 is capable of receiving data from one 10 Gigabit source or four 1 Gigabit sources.

RxNet Overview

This section shows the high level structure and flow through the receive Ethernet function within layer 202. The Rx accelerator unit 400 (FIG. 5) as will be explained in more detail hereinafter is part of Packet Acceleration and Virtualization layer 204.

Figure 5:
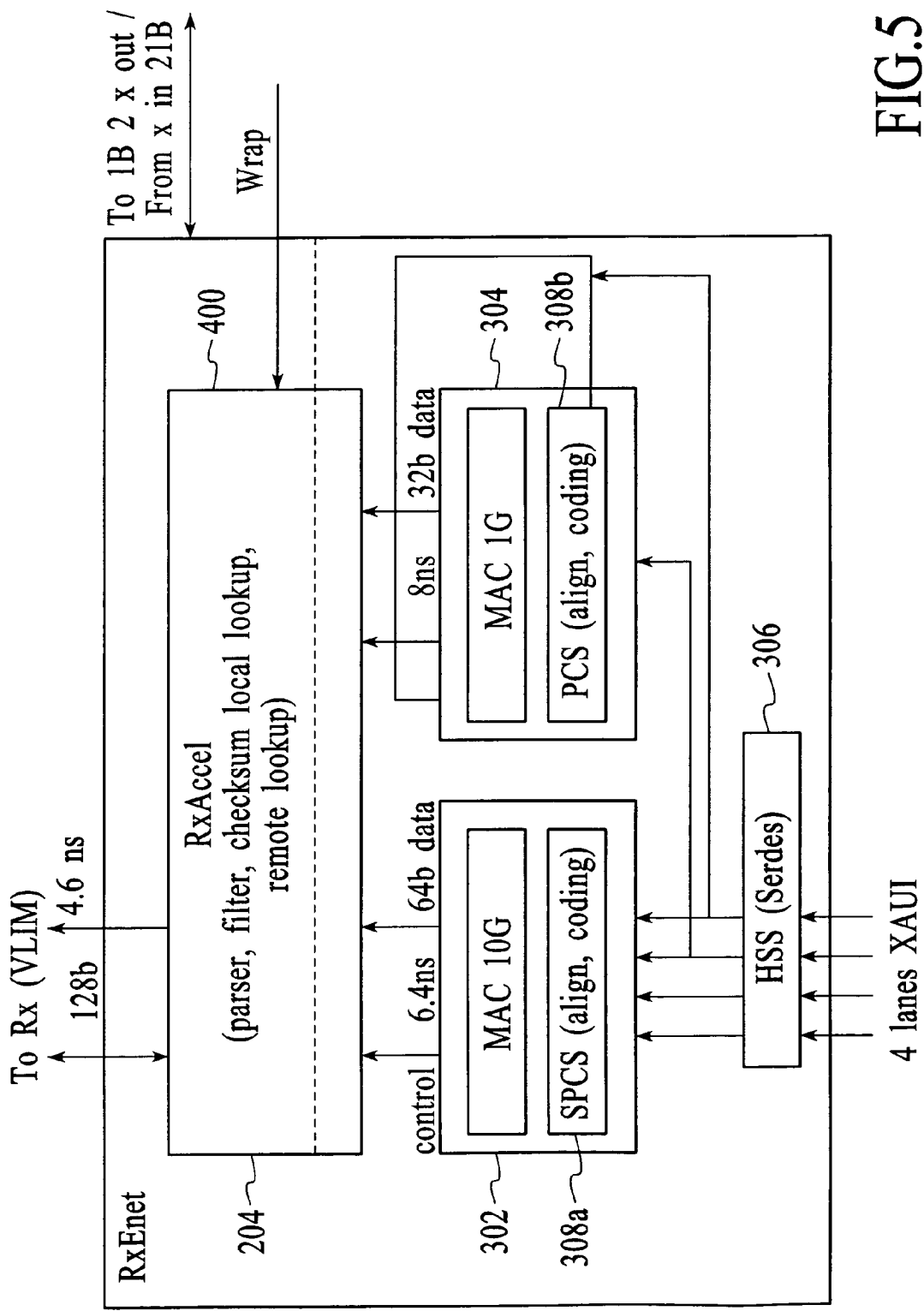
FIG. 5 shows the components and dataflow for one embodiment of RxNet in accordance with the present invention.

FIG. 5 shows the components and dataflow for one of RxNet. Data arrives on the XAUI interface and is processed by the HSS 304, analog coding units 308a and 308b and MAC which assembles and aligns the packet data in this embodiment in a 64 bit (10 G) or 32 bit (1 G) parallel data bus. Control signals are also generated which indicate start and end of frame and other packet information. The data and control pass through the RxAccel unit 400 which performs parsing, filtering, checksum and lookup functions in preparation for processing by the Receive Packet Processor (RPP) of the layer 206 (FIG. 2). In this embodiment, the clock is converted to a 4.6 ns clock and the data width is converted to 128b as it enters the RxAccel unit 400.

As data flows through the RxAccel unit 400 to the Virtual Lane Input Manager (VLIM) data buffers, the RxAccel unit 400 snoops on the control and data and starts its processing. The data flow is delayed in the RxAccel unit 400 such that the results of the RxAccel unit 400 are synchronized with the end of the packet. At this time, the results of the RxAccel unit 400 are passed to the VLIM command queue along with some original control information from the MAC. This control information is stored along with the data in the VLIM.

If the RxAccel unit 400 does not have the lookup entry cached, it may need to go to main memory through the GX bus interface. The GX bus operates at 4.6 ns. The VLIM can asynchronously read the queue pair resolution information from the RxAccel unit 400.

TxEnet Overview

This section provides an overview of the transmit structure and flow through Ethernet and Acceleration functions. The Tx accelerator unit 500 (FIG. 6) as will be explained in more detail hereinafter is part of Packet Acceleration and Virtualization layer 204.

Figure 6:
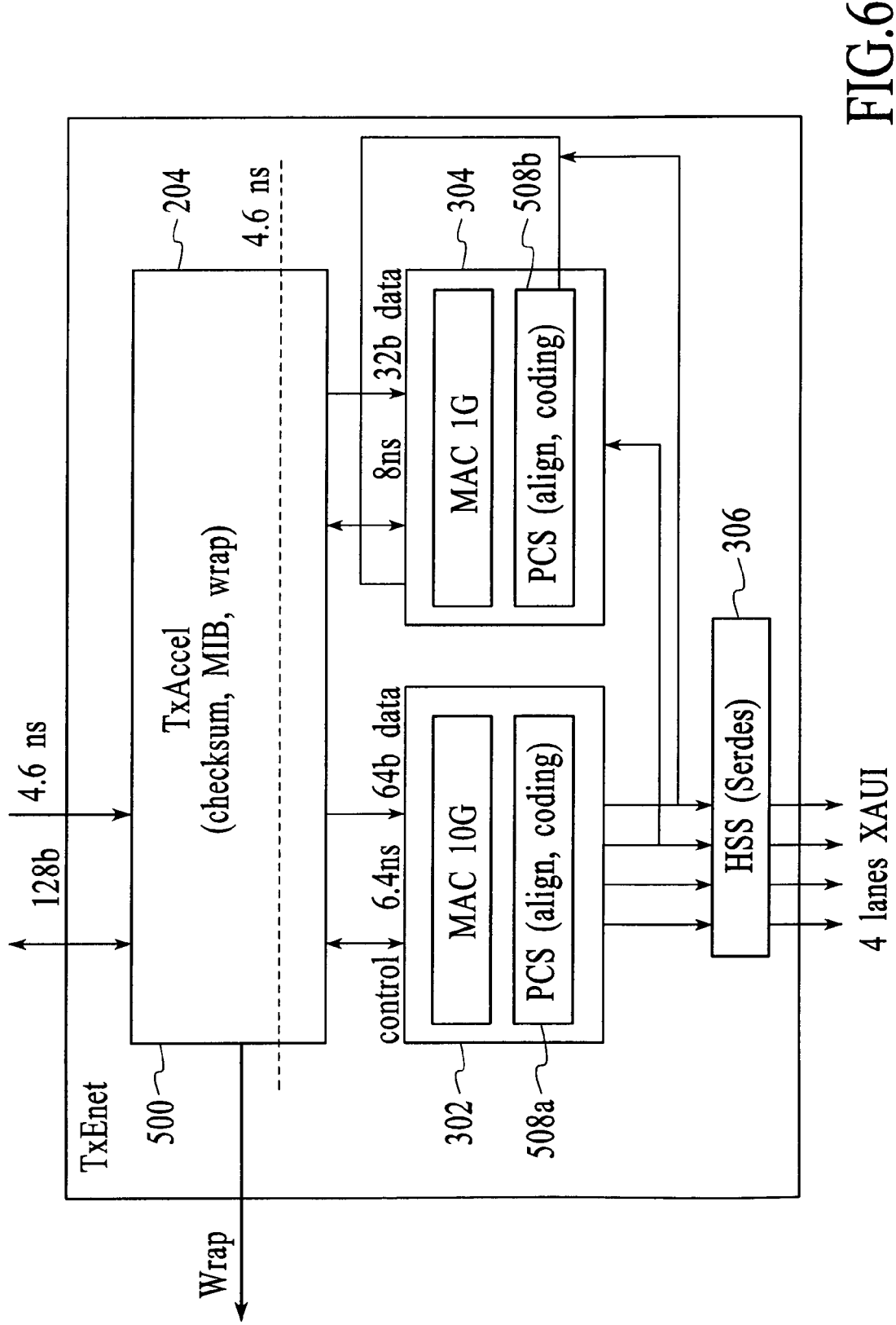
FIG. 6 shows the components and dataflow for one embodiment of TxEnet in accordance with the present invention.

FIG. 6 shows the components and dataflow for one TxEnet. Packet data and control arrives from the ENop component of the HEA 110. The Tx Accelerator (TxAccel) unit 500 interprets the control information and modifies fields in the Packet Header. It makes the wrap versus port decision based on control information or information found in the Packet Header. It also generates the appropriate controls for the TxMAC 302 and 304. The data flow is delayed in the TxAccel unit 500 such that the TxAccel unit 500 can update Packet Headers before flowing to the MAC 302 and 304. At the exit, the TxEnet, the data width is converted from 128 bits to 64 bits (10 G) or 32 bits (1 G). The data and control pass through a clock conversion function in the TxAccel unit 500 in order to enter the differing clock domain of the MAC 302. The MAC 302 and 304, analog converters 508a and 508b and HSS 306 format packets for the Ethernet XAUI interface.

Packet Acceleration and Virtualization Layer 204

Figure 7:
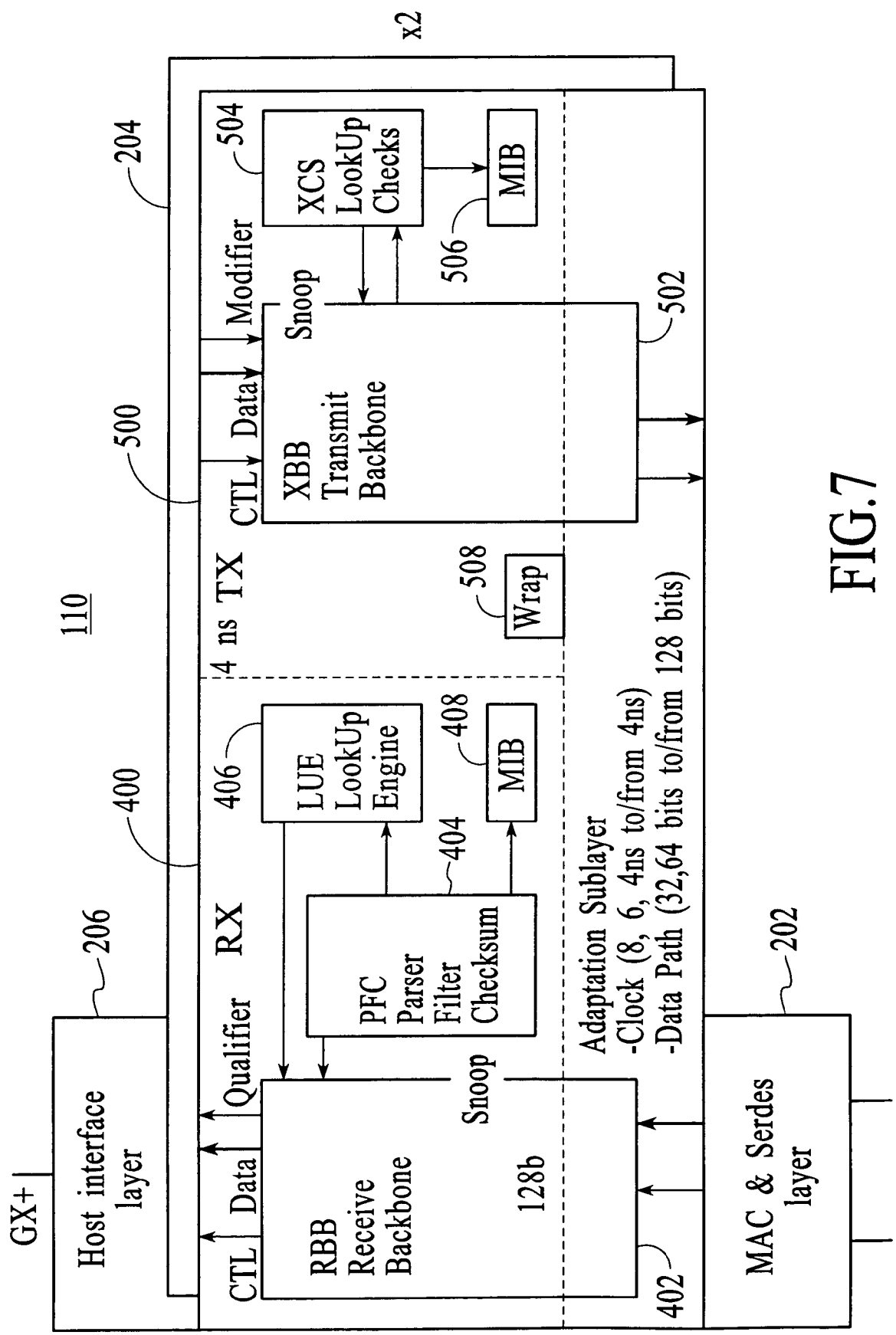
FIG. 7 is a block diagram of one embodiment of the host Ethernet adapter in accordance with the present invention with a more detailed view of the Packet Acceleration and Visualization Layer.

FIG. 7 is a block diagram of the HEA 110 with a more detailed view of the Packet Acceleration and Visualization Layer 204. The HEA Layer 204 comprises a receive (RxAccel) acceleration unit 400 and a transmit acceleration (TxAccel) unit 500. The RxAccel unit 400 comprises a receive backbone (RBB) 402, a parser filter checksum unit (PFC) 404, a lookup engine (LUE) 406 and a MIB database 408. The TxAccel unit 500 comprises the transmit backbone 502, lookup checks 504 and an MIB engine 506. The operation of the Rx acceleration unit 400 and the Tx acceleration unit 500 will be described in more detail hereinbelow.

Receive Acceleration (Rx) Unit 400

Figure 8:
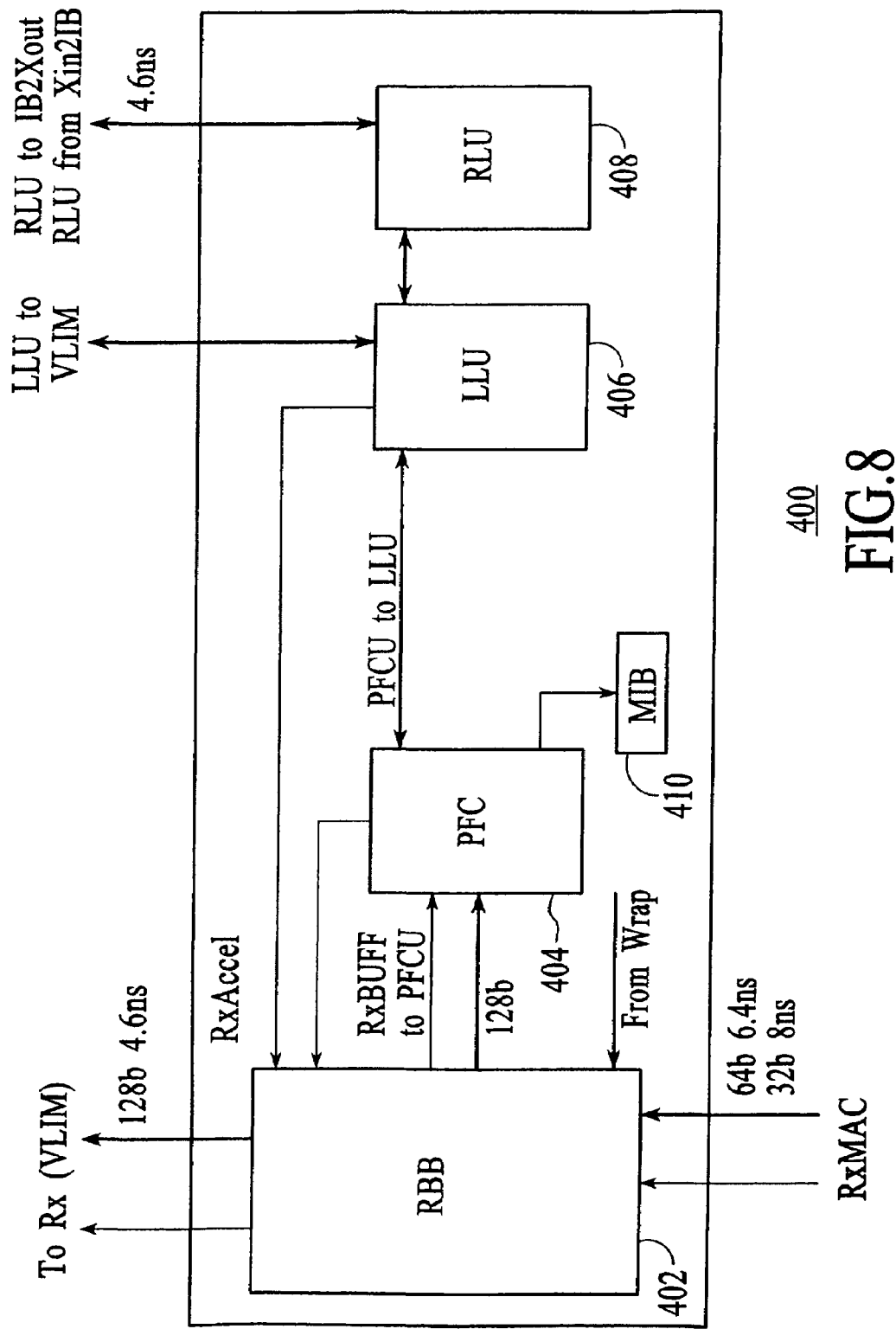
FIG. 8 shows one embodiment of the RxAccel unit in accordance with the present invention.

FIG. 8 shows that the RxAccel unit 400 is composed of the Receive Backbone (RBB) 402, the Parser, Filter and Checksum Unit (PFC) 404, the Local Lookup Unit (LLU) 406, the Remote Lookup Unit (RLU) 408 and an MIB database 410.

Data flows through the RxAccel from the RxMAC unaltered. The RBB 402 manages the flow of data and is responsible for the clock and data bus width conversion functions. Control and Data received from the RxMAC is used by the PFC 404 to perform acceleration functions and to make a discard decision. The PFC 404 passes control and data extracted from the frame, including the 5-tuple key, to the LLU 406 in order to resolve a Queue Pair number (QPN) for the RBB 402. The LLU 406 either finds the QPN immediately or allocates a cache entry to reserve the slot. If the current key is not in the cache, the LLU 406 searches for the key in main store. The PFC 404 interfaces to the MIB database 410 to store packet statistics.

Tx Acceleration 500

This section describes the high level structure and flow through the Transmit Acceleration unit 500 (TxAccel).

Figure 9:
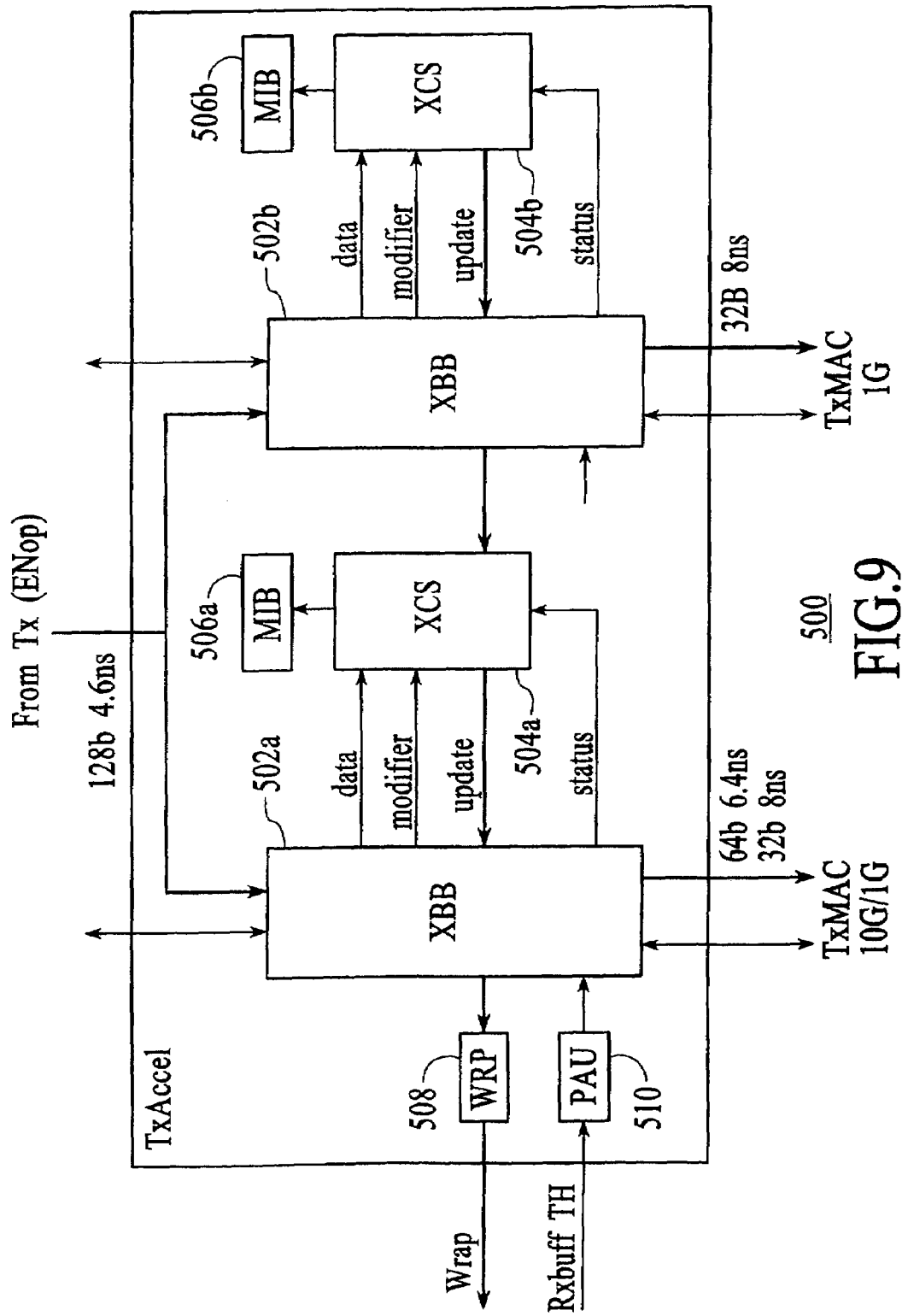
FIG. 9 shows one embodiment of the TxAccel unit in accordance with the present invention.

FIG. 9 shows that the TxAccel unit 500 is composed of two Transmit Backbones (XBB) 502a and 502b, two Transmit Checksum units (XCS) 504a and 504b, two Transmit MIBs 506a and 506b, one Wrap Unit (WRP) 508 and one Pause Unit (PAU) logic 510. Data flows through the TxAccel from the ENop and is modified to adjust the IP and TCP checksum fields. The XBB 502a and 502b manages the flow of data and is responsible for the clock and data bus width conversion functions. Control and Data received from the ENop is used by the XCS 504a and 504b to perform checksum functions. After the packet is transmitted (or discarded) by the MAC, the transmit status returns to the TxAccel for accounting. The XBB 502 transforms the information to the clock domain of the TxAccel. The status information is merged with original information obtained from the packet by the XCS 504 and passed to the MIB Counter logic 506a and 506b. The MIB logic 506a and 506b updates the appropriate counters in the MIB array. The Wrap Unit (WRP) 508 is responsible for transferring to the receive side packets XCSs 504a and 504b have decided to wrap. The Pause Unit (PAU) 510 orders the MAC to transmit pause frames based on the receive buffer's occupancy.

Host Interface Layer 206

Figure 10:
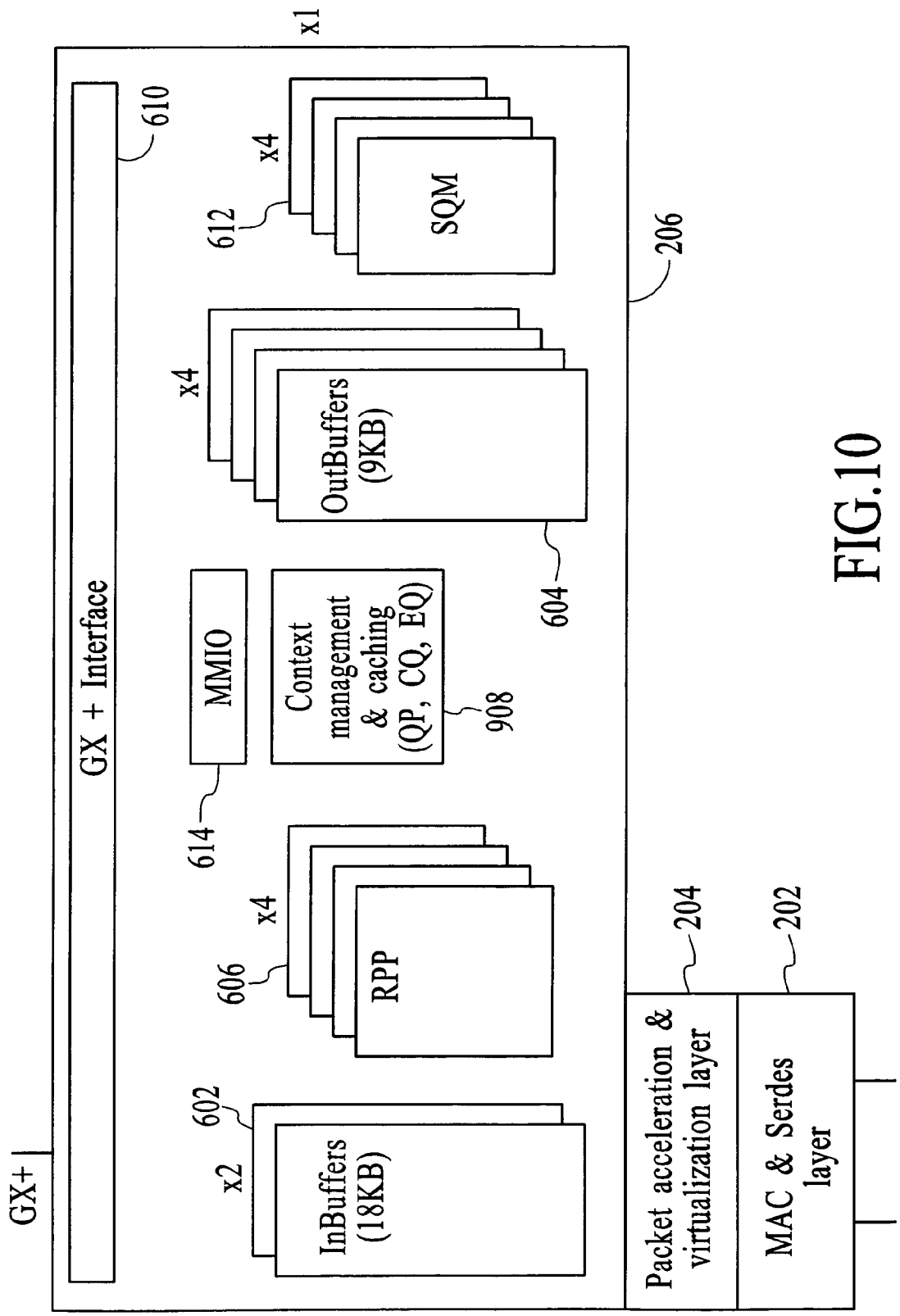
FIG. 10 is a block diagram of one embodiment of the host Ethernet adapter in accordance with the present invention with a more detailed view of the Host Interface Layer.

FIG. 10 is a block diagram of the HEA 110 with a more detailed view of the Host Interface Layer 206. The Host Interface Layer 206 includes input and output buffers 602 and 604 for receiving packets from the layer 204 and providing packets to layer 204. The layer 206 includes a Receive Packet Processor (RPP) 606 for appropriately processing the packets in the input buffer. The context management mechanism 908 provides multiple sub-queues per queue prior to enable effective buffer management for the TCP stack.

Demultiplexing Function

The Rx unit 400 of layer 204 in conjunction with components of the host interface layer 206 provides the packets to the appropriate portion of the processor. Accordingly, the received packets must be demultiplexed to ensure that they flow to the appropriate portion of the server.

To describe the details of this demultiplexing function refer now to the following in conjunction with FIG. 8 and FIG. 9.

Demultiplexing Implementation on the HEA Adapter

Before the Receive Packet Processor (RPP) 606 can work on a received packet, the queue pair context must be retrieved. The QP connection manager does this using a QP number. Since QP numbers are not transported in TCP/IP packets, it must be determined by other means. There are two general classes of QPs, a per-connection QP and a default QP.

Per-connection QP are intended to be used for long-lived connections where fragmentation of the IP packets is not expected and for which low-latency is expected. They require that the application utilize a user-space sockets library which supports the user-spacing queueing mechanism provided by the HEA 110. The logical port must first be found using the destination MAC address. Three types of lookup exist for per-connection QP:

1. New TCP connections for a particular destination IP address and destination TCP port. A lookup is performed based on the TCP/IP (DA, DP, Logical port) if the packet was a TCP SYN packet.

2. New TCP connections for a particular destination TCP port only (disregarding DA). A lookup is performed based on the TCP/IP (DP, Logical port) if the packet was a TCP SYN packet.

3. Existing TCP/UDP connection. A lookup is performed based on the TCP/IP 5-tuple plus the logical port if the packet was a non-fragmented unicast TCP or UDP packet.

Default QP are used if no per-connection QP can be found for the packet or if per-connection lookup is not enabled for a MAC address or if the packet is a recirculated multicast/broadcast packet. Generally default QP are handled by the kernel networking stack in the OS or hypervisor. These types of default QP exist in the HEA 110:

1. Default OS queue per logical port. (A logical port corresponds to a logical Ethernet interface with its own default queue. Each logical port has a separate port on the logical switch. There could be one or more logical ports belonging to an LPAR.)

A lookup is performed based on MAC address.

A direct index (logical port number) to the default OS queue is provided with recirculated (wrapped) multicast/broadcast packets.

2. MC or BC Queue.

A configured value if the packet is a multicast or broadcast packet which does not match one of the MAC addresses in the MAC lookup table.

3. Super-Default UC Queue.

If a UC packet does not match one of the configured MAC addresses, a default UC QPN may be used.

This mechanism allows for flexibility between the two extremes of queueing per connection and queueing per logical port (OS queue). Both models can operate together with some connections having their own queueing and some connections being queued with the default logical port queues.

Connection lookup is performed by the RxAccel unit 400. One such unit exists for each port group. Within the RxAccel unit 400, each component performs a portion of the process. The PFC extracts the needed fields from the packet header and determines the logical port number based on the destination MAC address. The Local Lookup Unit (LLU) 406 and Remote Lookup Unit (RLU) 408 are then responsible for resolving the QP number. The LLU 406 attempts to find a QPN using local resources only (cache and registers).

The purpose of the LLU 406 is to attempt to determine the QP number associated with the received packet. The QP number is required by the VLIM and RPP 606. It performs this task locally if possible (i.e. without going to system memory).

The QP number can be found locally in one of several ways:

Lookup in TS cache

Default partition QP

Default UC QP

If no match is found locally, then a preliminary check is made on the negative cache to see if the entry might be in present in system memory. If so, the RLU 408 is invoked to perform the search. If the RLU 408 is busy, a queue of requests can be formed which will be provided to the RLU 408 as it becomes free.

The LLU 406 communicates with the RBB 402 providing the QP number and/or the queue index to use for temporary queueing. If no eligible entries are available in the cache, the LLU 406 indicates to the RBB 402 that the search is busy. The packet must be dropped in this case.

The LLU 406 provides the QPN to the VLIM/unloader when a queue index resolution is requested and has been resolved. The RLU attempts to find a QPN using system memory tables.

The LLU utilizes a local 64 entry cache in order to find the QPN for TCP/UDP packets. If the entry is found in the cache, the RLU 408 does not need to be invoked. If the entry is not found in the cache, a preliminary check is made in the negative cache to see if the entry might be in the connection table. The negative cache is useful for eliminating unnecessary accesses to main memory when there are a few number of configured queues (note: since the size of the negative cache is small, it is only useful when the number of entries in the table is relatively small, that is, significantly less than 1K. As the number of entries approaches and exceeds 1K, the negative cache will become all 1s, thus making it non-useful. The purpose of the negative cache is to not penalize the OS queries when there are a small number of QP. A problem may arise when there are small number of active QP but a large number of configured QP. The OS queues will suffer in this case.) (e.g., when using most OS queues).

If the RLU 408 is invoked, it uses a hash of the 6-tuple (including logical port number) to fetch an 128 byte Direct Table (DT) entry. This DT entry contains up to eight 6-tuple patterns and associated QPN. If a match is found, no further action is required. If there are more than 8 patterns associated with this hash value, then a Collision Overflow Table (COT) entry may need to be fetched for additional patterns. If a match is found, the LLU 406 cache is updated with the found QPN.

When the RLU 408 must be invoked, the QPN can not be determined on the fly as the packet is being placed into the input buffers. In fact the QPN may be determined several packets later. For this reason, the RxAccel unit 400 may either provide a QPN or a queue index to the VLIM for packet queueing. If a QPN is provided, then the VLIM (unloader) may queue the packet directly for work by the RPP. If a queue index is provided, then the VLIM (unloader) must hold this packet to wait for resolution of the QPN. The QPN is always determined by the time the RPP is dispatched.

SYN packet lookup (2 or 3 tuple) uses the same cache and lookup tables as the 6-tuple lookup. Here is the rationale and key design points:

Perf requirements are relaxed (not real steady state) so we can access multiple times to the System memory Reuse 6 tuples Look Up resources (tables)

Use the 3-tuple to find the cache index for SYN packets to ensure that all packets added to this cache list belong to the same QP, whether matching 3-tuple, 2-tuple or none. Using this 6-tuple isn't good since if a non-SYN came in, it would get added to the list and be routed to the 3/2 tuple QP. Using a two-tuple would not work since the packet may end up not matching the two-tuple. Multiple packets with the same 2-tuple may get added to the list in this cache entry and may end up being moved to the wrong QP.

A check is NOT made for 6-tuple match when packet is a SYN. It is left to the host to check for connection already open on a SYN.

Connection Setup

If 2 tuple SYN routing (LPAR, DP), this pattern is installed in the table as <logical_port#, DA=0, DP, SA=0, SP=0, prot=0> (TCP=0)

If 3 tuple SYN routing (LPAR, DP, DA), this pattern is installed in the table as <logical_port#, DA, DP, SA=0, SP=0, prot=0> BUT install it in the DT at the index given by 2 tuple (i.e. DA=0).

Figure 11:
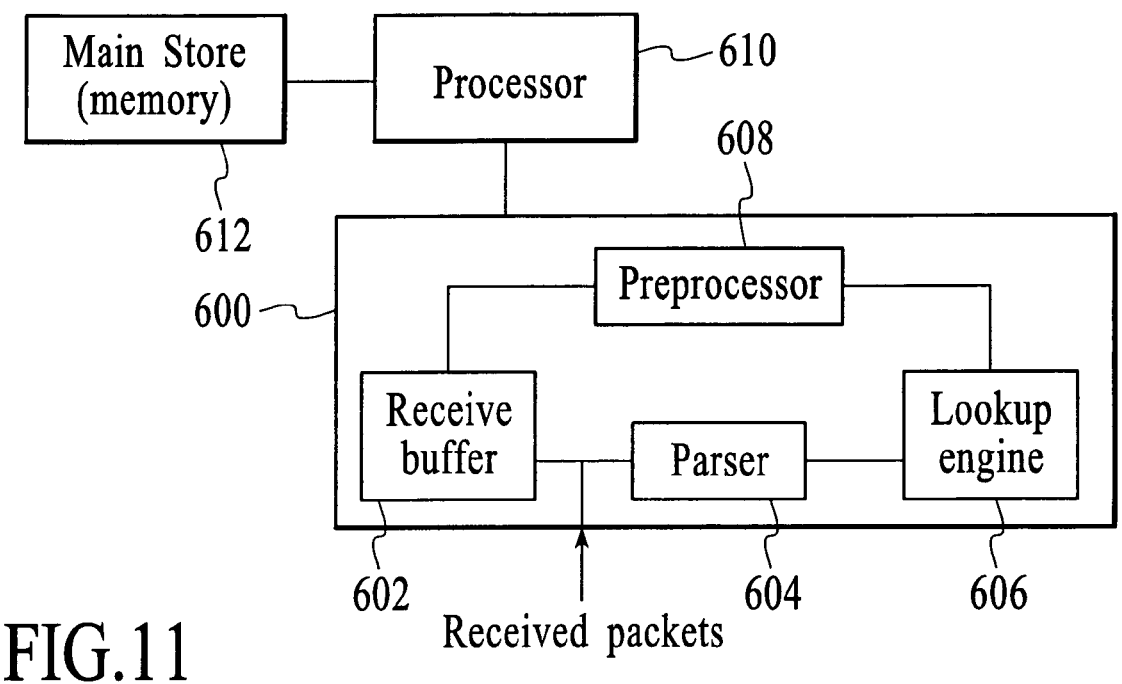
FIG. 11 is a block diagram of one embodiment of the host Ethernet adapter in accordance with the present invention with a more detailed view of the components used in packet header lookup.

To more particularly describe the present invention, refer to FIG. 11. FIG. 11 is a block diagram of one embodiment of a portion of a HEA 110 in accordance with the present invention with a more detailed view of the components used in packet header lookup. The HEA 110 includes an adapter 600 that includes a receive buffer 602, a parser 604, a lookup engine 606, and a processor 608, as well as a main store 612 and a processor 610.

The packet is received and provided, preferably in parallel, to the parser 604 and the receive buffer 602. The receive buffer 602 stores the packet, while the parser 604 parses the packet. The parser 604 parses the packet to obtain the header while the packet is still being received in the adapter 600. Stated differently, the parser 604 starts parsing the packet to obtain the header before the packet has been completely received by the HEA 110. The parser 604 provides the header to the lookup engine 606. The lookup engine 606 utilizes the header to perform a lookup. Preferably, the lookup engine 606 determines a hash of the header and uses this hash for the lookup. Also in a preferred embodiment, the lookup engine 606 performs a local lookup of a local cache (not shown in FIG. 11) and only performs a remote lookup when the resultant cannot be obtained using local resources only.

Using the system 600, the packet header lookup can be performed more efficiently. The parser 604 commences parsing the packet before the receipt of the packet is completed. Thus, the delay in performing the header lookup may be reduced. Moreover, a local lookup is preferably performed. Latencies for packets having headers which include repeat information may be further reduced.

Figure 12:
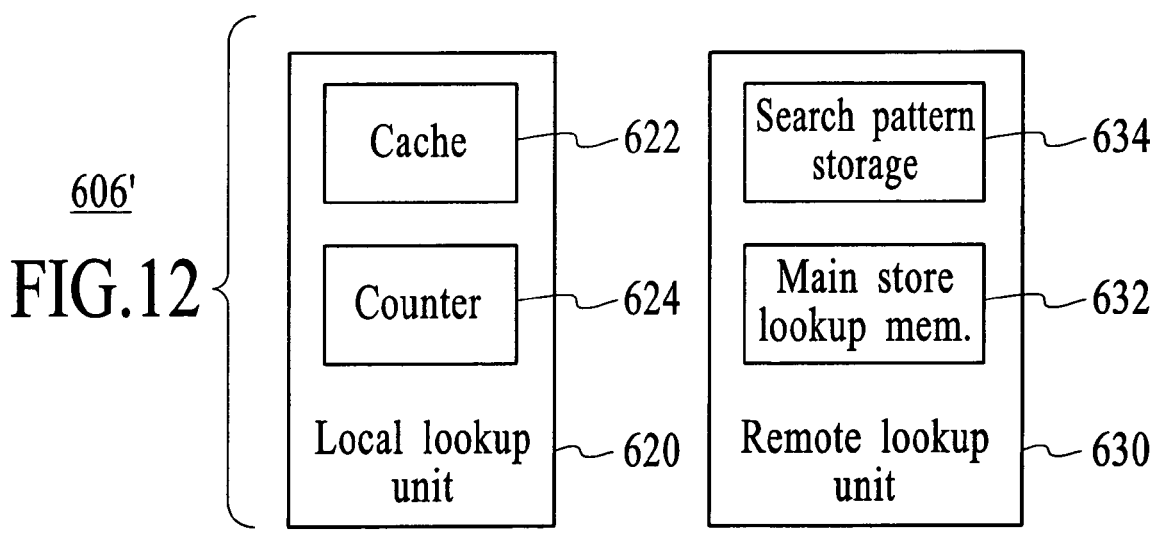
FIG. 12 is a block diagram of one embodiment of the lookup engine in accordance with the present invention.

FIG. 12 is a block diagram of one embodiment of the lookup engine 606' in accordance with the present invention. The lookup engine 606' is thus preferably used in the system 600 depicted in FIG. 11. Referring to FIGS. 11 and 12, the lookup engine 606' includes a local lookup unit 620 and a remote lookup unit 630. The local lookup unit 620 and the remote lookup unit 630 preferably correspond to the units 406 and 408 described above. The local lookup unit 620 includes a cache memory 622 and a counter 624. The cache 622 stores resultants from previous lookups for previously processed packets and the corresponding hashes. The remote lookup unit 630 includes a main store read memory 632 and a search pattern storage 634. As their names suggest, the local lookup unit 620 utilizes local resources, such as the cache 622, to perform a lookup corresponding to the header of the packet. The remote lookup unit 630 performs a lookup of the main store 612 by storing the appropriate search pattern (e.g. the hash corresponding to the header) in the search pattern storage 634. The resultant returned may be stored in the main store lookup memory 632.

The local lookup unit 620 determines whether the resultant of the lookup can be obtained from the cache 622. If so, the resultant is either already stored in the cache 622 or the cache 622 is waiting for the remote lookup unit 630 to return the resultant from a search of the main store 612 due to a previous packet. If the cache 622 is waiting, the entry in the cache corresponding to the resultant is not yet resolved. If the resultant is already in the cache 622, the local lookup unit 620 returns the resultant. Thus, the processor 608 may quickly perform any processing desired and the packet data stored in the appropriate destination buffer of the main store 612. If the entry corresponding to the resultant has not been resolved, then the index of that entry of the cache 622 is returned and the counter 624 incremented to track the packet. Once the entry is resolved, the counter 624 can be decremented and the resultant returned.

Using the lookup engine 606', the packet header lookup can be performed more efficiently. The parser 604 still commences parsing the packet before the receipt of the packet is completed. Thus, the delay in performing the header lookup may be reduced. Moreover, the local lookup unit 620 performs a local lookup. If a resultant is in the cache 622, delays due to a remote lookup may be avoided. Latencies for packets having headers which include repeat information may thus be further reduced.

Figure 13:
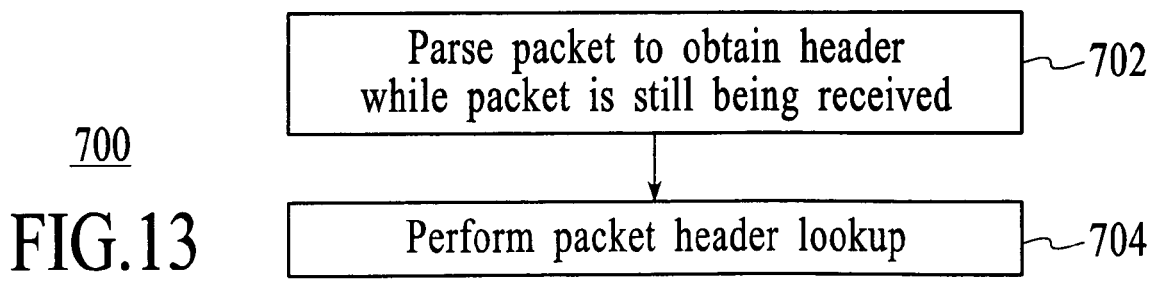
FIG. 13 is a flow chart depicting of one embodiment of a method for performing a packet header lookup in accordance with the present invention.

FIG. 13 is a flow chart depicting of one embodiment of a method 700 for performing a packet header lookup in accordance with the present invention. The method 700 is described in connection with the system 600 depicted in FIGS. 11 and 12. However, another system might be used to implement the method 700. The packet is parsed to obtain the header while the packet is still being received by the system 600, via step 702. Step 702 is preferably performed by providing the packet both to the parser 604 and the receive buffer 602. Step 702 thus also includes utilizing the parser 602 to start parsing the packet before the receipt is complete and to obtain the header. A lookup is performed using the header, via step 702. Step 702 includes providing the header to the lookup engine 606/606'. The lookup engine 606/606' preferably utilizes the data in the header, such as the five-tuple, to provide a hash used to search for the resultant corresponding to the header. In a preferred embodiment, a local search is performed using the local lookup unit 620. If the resultant is not available locally, then a remote search of the main store 612 is performed. Thus, the resultant can be obtained, and the packet processed.

Using the method 700, the packet header lookup can be performed more efficiently. Parsing of the packet starts in step 702 before the receipt of the packet is completed. Thus, the delay in performing the header lookup may be reduced. Moreover, a local lookup may be performed in step 704. Latencies for packet headers having their resultants stored locally may thus be reduced.

Figure 14:
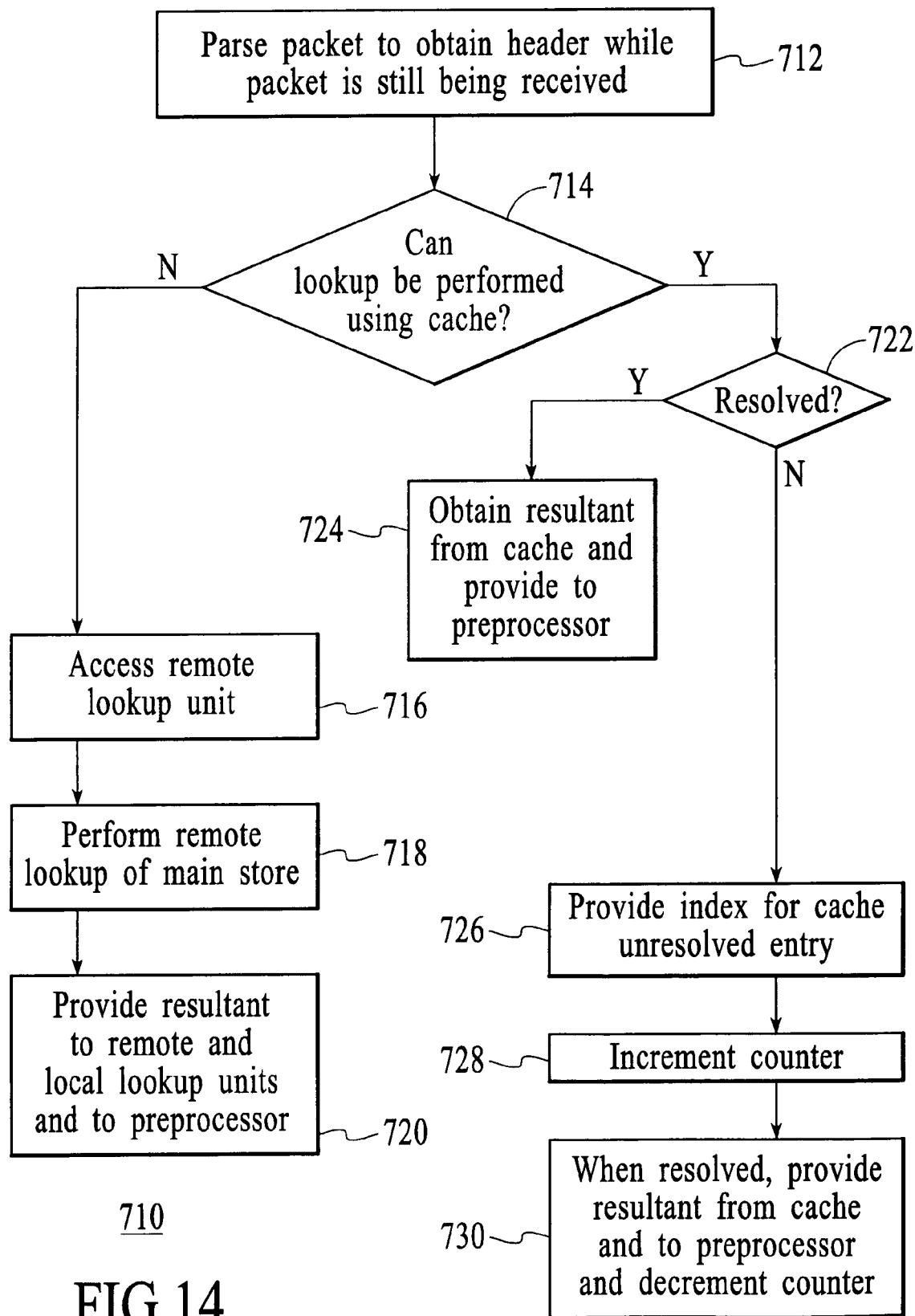
FIG. 14 is a flow chart depicting of another embodiment of a method for performing a packet header lookup in accordance with the present invention.

FIG. 14 is a flow chart depicting another embodiment of a method 710 for performing a packet header lookup in accordance with the present invention. The method 710 is described in the context of the system 600 described in FIGS. 11 and 12. However, another system might be used to implement the method 710.

The packet is parsed to obtain the header while the packet is still being received by the system 600, via step 712. Step 712 is preferably performed by providing the packet both to the parser 604 and the receive buffer 602. Step 712 also includes utilizing the parser 602 to parse the packet and to obtain the header. It is determined whether the resultant corresponding to the header can be obtained using local resources, such as the cache, via step 714. Step 714 preferably includes obtaining a hash based on the header and providing the hash to the local lookup unit 620. If it is determined that the resultant is not available through local resources, then the remote lookup unit 630 is accessed to perform a remote lookup, via step 716. In a preferred embodiment, the local lookup unit 620 enqueues the remote lookup and writes the hash into the cache 622 so that the corresponding entry will store the resultant once the remote lookup is completed. A lookup of the main store is performed, via step 718. Step 718 includes writing the hash to the search pattern memory 634 and obtaining space in the main store lookup memory 632 to store the resultant of the search of the main store 612. Once a resultant has been obtained, the resultant is provided to the remote lookup unit 630, as well as to the local lookup unit 620, via step 720. The local lookup unit 620 writes the resultant to the appropriate entry of the cache 622. The resultant is also provided to the processor 608 for processing in step 720. Thus, the packet may be processed and the data stored in the destination buffer of the main store 612.

If the resultant may be available locally, then there is an entry in the cache 622 corresponding to the header. However the entry may not be resolved. It is determined by the local lookup unit 620 whether the entry is resolved, via step 722. If the entry is resolved, then the resultant is stored in the entry corresponding to the header. Thus, the resultant is obtained from the cache, via step 724. If the entry is not resolved, then a previous packet has a hash corresponding to the hash currently being searched. However, the remote lookup for this previous packet has not yet been completed. Consequently, the index of the appropriate cache entry is provided, via step 726. The counter 624 is also incremented, via step 728. Once the entry has been resolved by a remote lookup, such as in steps 716-720, the resultant is provided, via step 730. In addition, the counter 624 is decremented because the packet header lookup has been completed for the unresolved entry. Thus, the processor 608 receives the resultant of the header lookup. Consequently, processing of the packet can be completed and the packet data stored in the destination buffer of the main store 612.

Using the method 710 latencies in packet header lookup may be reduced. Because the packet is parsed before receipt is complete, the packet header may be obtained more rapidly and delays reduced. Furthermore, because a local lookup is possible, the packet header lookup may be reduced when the resultant is available locally. Thus, delays may be further reduced.

A method and system for more efficiently performing a packet header lookup has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for performing a lookup for a packet in a computer system, the packet having a header, the method comprising:

parsing the packet for the header prior to receipt of the packet being completed, wherein the header is separated from data payload;

demultiplexing the packet;

hashing the header;

using the hashed header, performing a lookup corresponding to the header, wherein the lookup is a local lookup of a cache;

returning a resultant corresponding to the header if the cache includes an entry corresponding to the header and the entry stores the resultant;

providing an index for the packet if the cache includes an entry corresponding to the header but the entry does not store the resultant;

incrementing a counter if the index is provided;

decrementing the counter if the resultant has been resolved;

performing a remote lookup of a memory if the cache does not have an entry corresponding to the header; and storing the resultant of the memory lookup in the entry of the cache corresponding to the header.

\* \* \* \* \*